(12) United States Patent
Murphy

(10) Patent No.: US 10,031,770 B2
(45) Date of Patent: Jul. 24, 2018

(54) SYSTEM AND METHOD OF DELAYED CONTEXT SWITCHING IN PROCESSOR REGISTERS

(71) Applicant: Intel Corporation, Santa Clara, CA (US)

(72) Inventor: Nicholas J. Murphy, The Sands (GB)

(73) Assignee: Intel Corporation, Santa Clara, CA (US)

( * ) Notice: Subject to any disclaimer, the term of this patent is extended or adjusted under 35 U.S.C. 154(b) by 954 days.

(21) Appl. No.: 14/266,056

(22) Filed: Apr. 30, 2014

(65) Prior Publication Data

US 2015/0317161 A1 Nov. 5, 2015

(51) Int. Cl.
*G06F 9/30* (2018.01)
*G06F 9/46* (2006.01)

(52) U.S. Cl.
CPC .......... *G06F 9/461* (2013.01); *G06F 9/30145* (2013.01); *G06F 9/30181* (2013.01)

(58) Field of Classification Search
CPC .... G06F 9/30145; G06F 9/48; G06F 9/30181; G06F 9/461; G06F 9/3851; G06F 9/462; G06F 9/3863
See application file for complete search history.

(56) References Cited

U.S. PATENT DOCUMENTS

| | | | | |
|---|---|---|---|---|
| 6,700,581 B2* | 3/2004 | Baldwin | ............... | G06T 15/005 345/501 |
| 6,731,288 B2* | 5/2004 | Parsons | ................. | G06T 15/005 345/426 |
| 6,847,370 B2* | 1/2005 | Baldwin | ................... | G09G 5/39 345/562 |
| 7,117,346 B2* | 10/2006 | Moyer | ................ | G06F 9/30123 712/217 |
| 7,234,144 B2* | 6/2007 | Wilt | ....................... | G06F 9/3851 710/52 |
| 7,640,421 B1* | 12/2009 | Garlick | .................... | G06F 9/461 712/228 |
| 7,900,207 B2* | 3/2011 | Nemirovsky | ......... | G06F 9/4818 712/23 |
| 7,962,314 B2* | 6/2011 | Chernoff | ................ | G06F 9/542 702/121 |
| 8,139,070 B1* | 3/2012 | Ostiguy | ................... | G06F 9/461 345/506 |
| 9,053,025 B2* | 6/2015 | Ben-Kiki | ............ | G06F 11/0793 |
| 9,361,116 B2* | 6/2016 | Ben-Kiki | ............ | G06F 9/30145 |
| 2003/0164824 A1* | 9/2003 | Parsons | ................. | G06T 15/005 345/419 |

(Continued)

OTHER PUBLICATIONS

Pasricha et al "Improving Branch Prediction Accuracy in Embedded Processors in the Presence of Context Switches", 2003 IEEE, 6 pages.*

(Continued)

*Primary Examiner* — Van Nguyen
(74) *Attorney, Agent, or Firm* — Green, Howard & Mughal LLP

(57) ABSTRACT

Systems, articles, and methods of context switching include requesting a transition context switch deferrable until a state to be saved is smaller than at the time the request is made, and forcing a context switch to occur if a condition is met before the request is carried out.

22 Claims, 8 Drawing Sheets

300

REQUEST A TRANSITION CONTEXT SWITCH DEFERABLE UNTIL A STATE TO BE SAVED IS SMALLER THAN AT THE TIME THE REQUEST IS MADE
302

FORCING A CONTEXT SWITCH TO OCCUR IF A CONDITION IS MET BEFORE THE REQUEST IS CARRIED OUT
304

(56) References Cited

U.S. PATENT DOCUMENTS

2013/0332711 A1* 12/2013 Leidel ................ G06F 9/30145
712/227

OTHER PUBLICATIONS

Paul et al "Reducing the Number of Context Switches in Real Time Systems", 2011 IEEE, 6 pages.*
Kalem "Mapping a Real-Time Video Algorithm to a Context-Switched FPGA", 1997 IEEE, pp. 236-237.*

* cited by examiner

300    FIG. 3

REQUEST A TRANSITION CONTEXT SWITCH DEFERABLE UNTIL A STATE
TO BE SAVED IS SMALLER THAN AT THE TIME THE REQUEST IS MADE
302

FORCING A CONTEXT SWITCH TO OCCUR IF A CONDITION IS MET
BEFORE THE REQUEST IS CARRIED OUT
304

SYSTEM AND METHOD OF DELAYED CONTEXT SWITCHING IN PROCESSOR REGISTERS

BACKGROUND

Context switching allows several applications to share the same hardware for the appearance of concurrency. The context is the state or contents of a processor (or processing accelerator) at any point in time, and which may include the contents of the registers and other local memory on the processor as well as the program counters or pointers that indicate the progression of the processor in a program or task being performed. The switching may be between threads or processes. In the case of image processing, the context switching may be between imaging kernels, where each kernel is a program executed on blocks of pixel data less than the entire image. During context switching, the processor's progression on one kernel is stopped, the state for the kernel is saved in a memory. Then, the state from a different, second kernel or process is restored on the processor, and the point in the task for the second kernel is determined by a program counter for example, for the processor to continue to perform further work on that second kernel until progression for this second kernel also is stopped, saved, and replaced, and so on.

Context switching is usually either pre-emptive or cooperative. In pre-emptive context switching, the processor may enforce switching at certain times among kernels or processes for example. This, however, may include saving all of the current state ("all state") without knowledge of what is actually needed. For image processing, this may include switching out the entire contents of a relatively large, local, random access memory (RAM), thereby raising the cost in time and power consumption to save the state for the context switch. In cooperative switching, an application or program may voluntarily give up its processor time. Thus, cooperative switching requires the owner (application or program) to voluntarily relinquish control. This may introduce unreliable quality of service (QOS) such that target bitrates or frame rates may not be met, which may be critical with real-time image processing for example. Thus, a more efficient context switching that meets quality of service targets is desired.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures.

DETAILED DESCRIPTION

Figure 1:
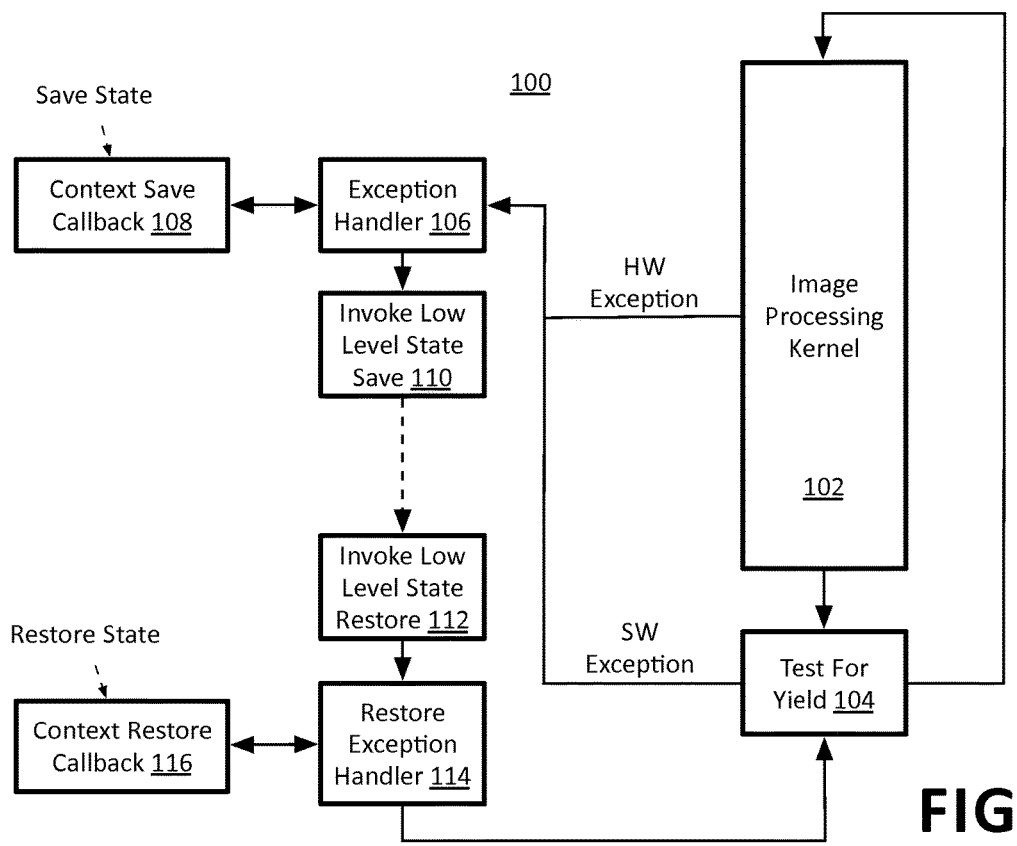
FIG. 1 is an illustrative diagram of an instruction-level schematic of a context switching system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware alone or hardware in combination with firmware and/or software. The material disclosed herein also may be at least partially implemented as instructions stored on a machine-readable medium or memory, which may be read and executed by one or more processors. A machine-readable medium (or memory) may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium or memory, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to context switching.

As explained above, context switching is used to allow multiple threads or processes, and in one example image processing kernels, to share the same hardware. With image processing, hardware imaging accelerators typically use a large amount of retained state, such as one or more large blocks of local RAM, which may be saved at each context switch. A typical pre-emptive context switch may include saving all of the contents of the RAM to a memory, such as to a system DRAM by one example, even though most of the contents may not be needed. Image processing algorithms, however, often use a lot of internal state, for example line buffers, that expire at predictable points such as the end of each frame (at a vertical blanking for example). At the time of an end of a frame, the state that should be saved for context switching will be reduced or minimized In other words, while the accelerator is working on a frame, the RAM may hold the data the accelerator is using to perform computations and may include pixel data, transform coefficient matrices, sum tables or integral images, filtered values, and so forth. When the processing of a current frame is complete, the data in the RAM is no longer needed for computations for the current frame, and the accelerator is ready to replace the old data for data to be used for the next frame. Thus, the old data in the RAM no longer needs to be saved for context switching. Unfortunately, a pre-emptive switch has no knowledge of the lifetime of the data and saves everything in the state anyway.

Also as mentioned above, while typical cooperative context switching may delay the switch until there is less state to save, this method often fails to meet quality of service (QOS) targets such as bitrate or frame per second targets for image processing of a video sequence due to the unbounded delay on when it may take place.

To overcome these disadvantages, a system and method disclosed herein provides efficient context switching of hardware image processing accelerators. This is accomplished by combining both pre-emptive and cooperative context switching techniques to allow real-time QOS targets to be hit but with, on average, much greater efficiency. By one form, this may be accomplished by a two stage context switch where initially, the accelerator may defer the context switch until the state that is to be saved is reduced or minimized. If the accelerator defers too long, however, an immediate, though more expensive, context switch may be demanded. Here, more expensive refers to number of bits and amount of time to load and unload the data in a memory.

Referring to FIG. 1, now in more detail, a system 100 is working on an image processing kernel 102, which may be one of many kernels to be applied to images in a video sequence. A transitional context switch may be performed to replace the data for one kernel with that of another kernel by one example, to maintain concurrency while reducing the state saved for the context switch to attempt to meet QOS targets. Transitional refers to a point in a process being performed by a processor or processing accelerator where at least a portion of the data in a shared memory, but in some cases most or all of the data in a dedicated memory, being used for the process is no longer needed, thereby reducing the state to be saved for the context switch. A process may have periodic or repeating transitions, such as between frames of video data. When the system 100 determines that the processing kernel 102 has used its allocated time slot, it indicates to the kernel that a context switch should be performed at the next transition point. The kernel 102 tests for this request to yield (also referred to ask a request for a transition context switch) 104 when it reaches its next transition. If the kernel 102 exceeds a maximum delay before reaching the transition point, the system 100 may force a pre-emptive context switch through a hardware exception.

If the kernel 102 reaches the yield test and determines that a context switch has been requested, it may execute a software exception that causes an exception handler 106 to be executed. The exception handler 106 then issues a context save callback 108 to the application or kernel 102 performing the current process to determine which data should be included in a saved state. Otherwise, a hardware (HW) exception command causes the kernel 102 to be interrupted and the exception handler 106 executed, which may be the same handler as used for the software exception although there could be different handlers. In one form, the hardware exception may cause an unconditional hardware (or low level) save 110 of all processor state. In another form, the hardware exception may execute the application callback 108 in which case the application has the opportunity to reduce the amount of state saved by inspecting the status of data structures to determine if they are still in use; this process is similar to a transitional context switch except that it differs in degree of effectiveness. A transitional switch takes place at a known point where state that must be saved can be predetermined whereas a pre-emptive switch takes place at an unpredictable point where the state that must be saved is determined by analysis at that time, and which may be a time at which all state must be saved. Following the application context save the low level state of the hardware, such as the program counters and status flags, are saved by a dedicated state machine 110.

The restore may be performed with similar steps only in reverse. Thus, a low level state restore 112 may be invoked to restore the state saved in step 110. When the low level state has been restored the restore exception handler 114 is invoked that calls the context restore application callback 116. The application restore callback determines the state saved in step 108 and issues commands to restore that state. When the state has been restored execution of the kernel 102 can continue.

Figure 2:
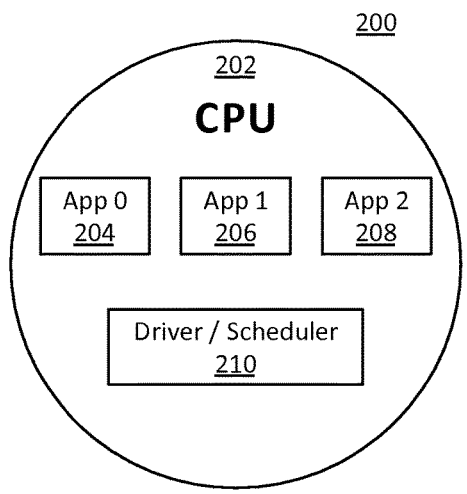
FIG. 2 is an illustrative diagram of an central processing unit to perform context switching.

Referring to FIG. 2, a CPU 202 may execute multiple applications 204, 206, 208 that make use of the accelerator system 100 in which case a scheduler 210 determines which application should be serviced by the accelerator system at any time. The scheduler issues transitional or pre-emptive context switch instructions to accelerator system 100 according to its scheduling policy.

Figure 3:
FIG. 3 is an illustrative diagram of a flow chart showing an example context switching process.

Referring to FIG. 3, a flow chart illustrates an example process 300, arranged in accordance with at least some implementations of the present disclosure. In general, process 300 may provide a computer-implemented method for context switching. In the illustrated implementation, process 300 may include one or more operations, functions or actions as illustrated by one or more of operations 302 and 304. By way of non-limiting example, process 300 will be described herein with reference to operations discussed with respect to the figures and implementations described herein.

Another way to articulate the details here is to recite that the process 300 may include "requesting a transition context switch deferrable until a state to be saved is smaller than at the time the request is made" 302. This may include scheduling a context switch to occur during a transition in a process being performed by a processing accelerator, wherein the transition reduces the state to be saved to perform the context switch and restored to continue performing the process later. By one example, while the context switching may be applied to the processing of any application, the transition may include a time period between processing of frame data of two frames in a video sequence of a plurality of frames being processed. Particularly, the transition may comprise a time period when the processor is finished using image data of one frame in a memory, which may be a local memory by one example, and before the image data of a next frame to be processed is placed in the memory so that the image data at the memory does not need to be saved as part of the state for the context switch. In the case of image processing, this may significantly reduce the load for the state, such as hundreds of Kbytes for on-chip RAM.

Process 300 also may include "forcing a context switch to occur if a condition is met before the request is carried out" 304. This may include forcing a context switch rather than waiting for the transitional context switch to occur. Thus, forcing the context switch may occur when delay or waiting for the transitional context switch to occur will cause the processor to miss a time-based target. The delay may be caused by the gathering of data to determine which data to save and which data to discard, or the delay may be caused by the system performing other tasks. By one form, the time-based target is associated with a target frame rate (frames per second (fps)) associated with a video sequence. The forced context switch may be more like a pre-emptive context switch that saves the entire state or at least significantly more data than the transitional context switch would have saved.

Figure 4:
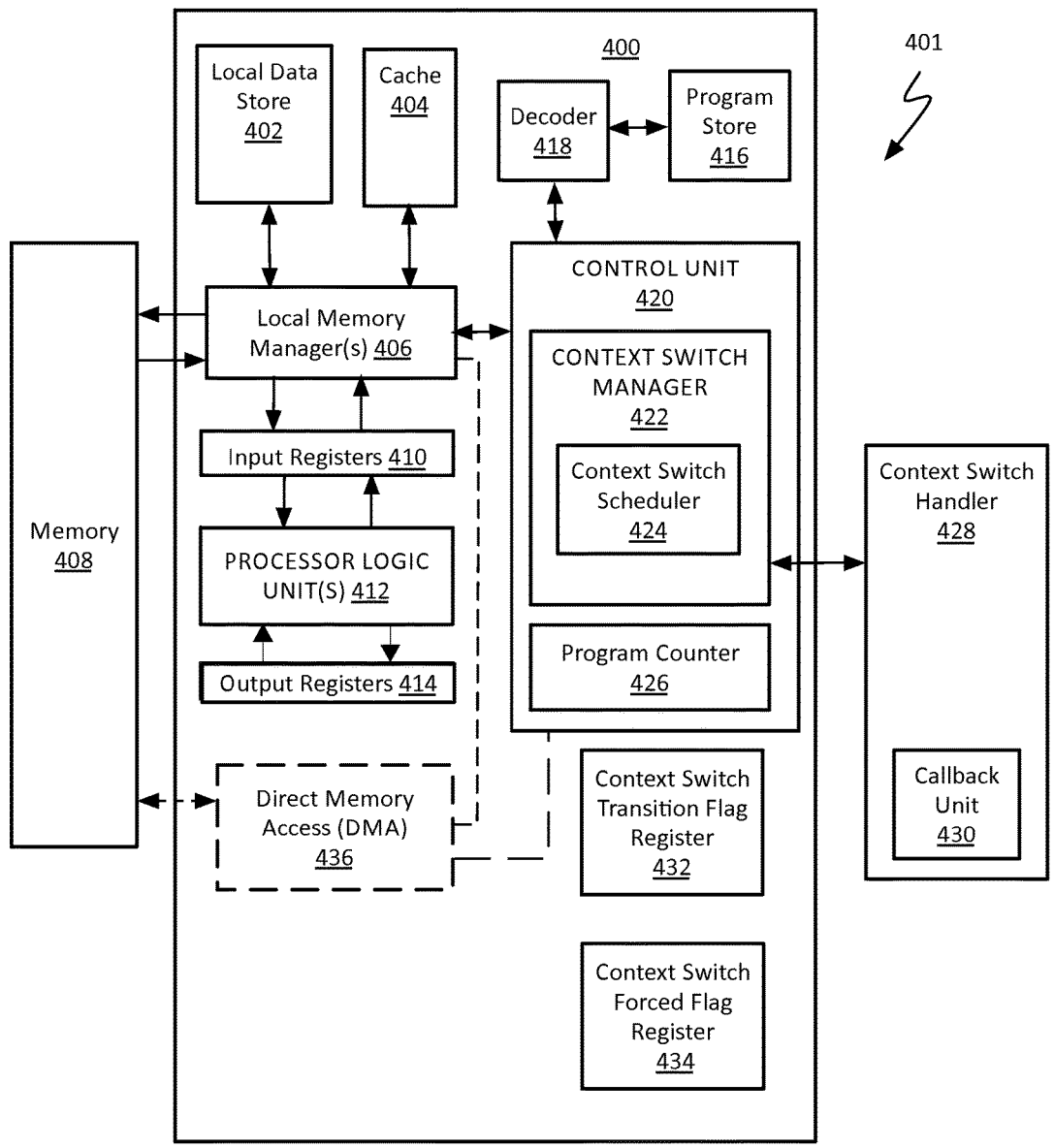
FIG. 4 is an illustrative diagram of a system that performs context switching.

Referring to FIG. 4, in order to perform the context switching, a system 401 is provided which may be a processing accelerator, 400 (which may be one or more processors, CPUs, GPUs, or other processing device). The processing accelerator 400 may have a local memory or data store 402 such as a local random-access memory (RAM) or on-chip RAM, and so forth, to store the data that is being worked upon or used in calculations by the system 400. A cache 404, such as a CPU cache, may also be provided to hold instructions/applications and/or other data being used. These memories may be controlled by one or more memory managers 406 that also communicate with one or more external memories 408 such as a main memory, such as DRAM, or other non-local memory component that is external to the processing accelerator 400 and may be used to store the data for a context switch that is to be restored later. It will be appreciated that the state for a context switch may be stored in various different memories, and may be saved in more than one memory. Also, the state may be saved in a dedicated memory, or a memory that is shared with other data. In one example, the data may be moved from one part of the same memory to another for the context switch. By another example, the data is not even moved but simply designated as saved state waiting for restoration. The processing accelerator 400 also may have at least one processor logic unit 412, and the input and output registers 410, 414 to the processor logic unit. The processor logic unit 412 may include at least one arithmetic logic unit (ALU), floating point unit (FPU), and/or other processor logic unit that performs the computations and manipulates the data to obtain desired results. The memory manager 406 also may control the data flow into and out of the registers.

The processing accelerator 400 also may have a program store 416 to provide instructions to perform policies and computations for applications as well as obtaining data. This may be in the form of dedicated or shared memory. Such instructions may be decoded by a decoder 418, which then provides the instructions to a control unit 420. The control unit 420 controls components of the processing accelerator 400 and may have a context switch manager 422. The context switch manager 422 may have a context switch scheduler 424 that determines when the transitional context switch should take place. The context switch scheduler 424 communicates with a context switch handler 428 which may be a software program, by one example, held in non-local memory or other memory, and may have a callback unit 430 to communicate with running applications to determine which data to save in the state and which data to discard. The control unit 420 also may have a program counter 426 to determine where along a process being performed by the processing accelerator 400 the process currently is, so that the current remaining hardware state may be established and saved. The processing accelerator 400 may also have at least one context switch transition (or in some cases cooperative) flag register 432 to indicate that a transitional context switch is being requested, and a context switch forced (or pre-emptive) flag register 434 to indicate that the forced context switch is required.

The processing accelerator 400 also may have a direct memory access (DMA) device to more easily obtain data from main memory for example, and that may be used by the context switch manager 420 and context switch handler 428 as explained below.

Figure 5:
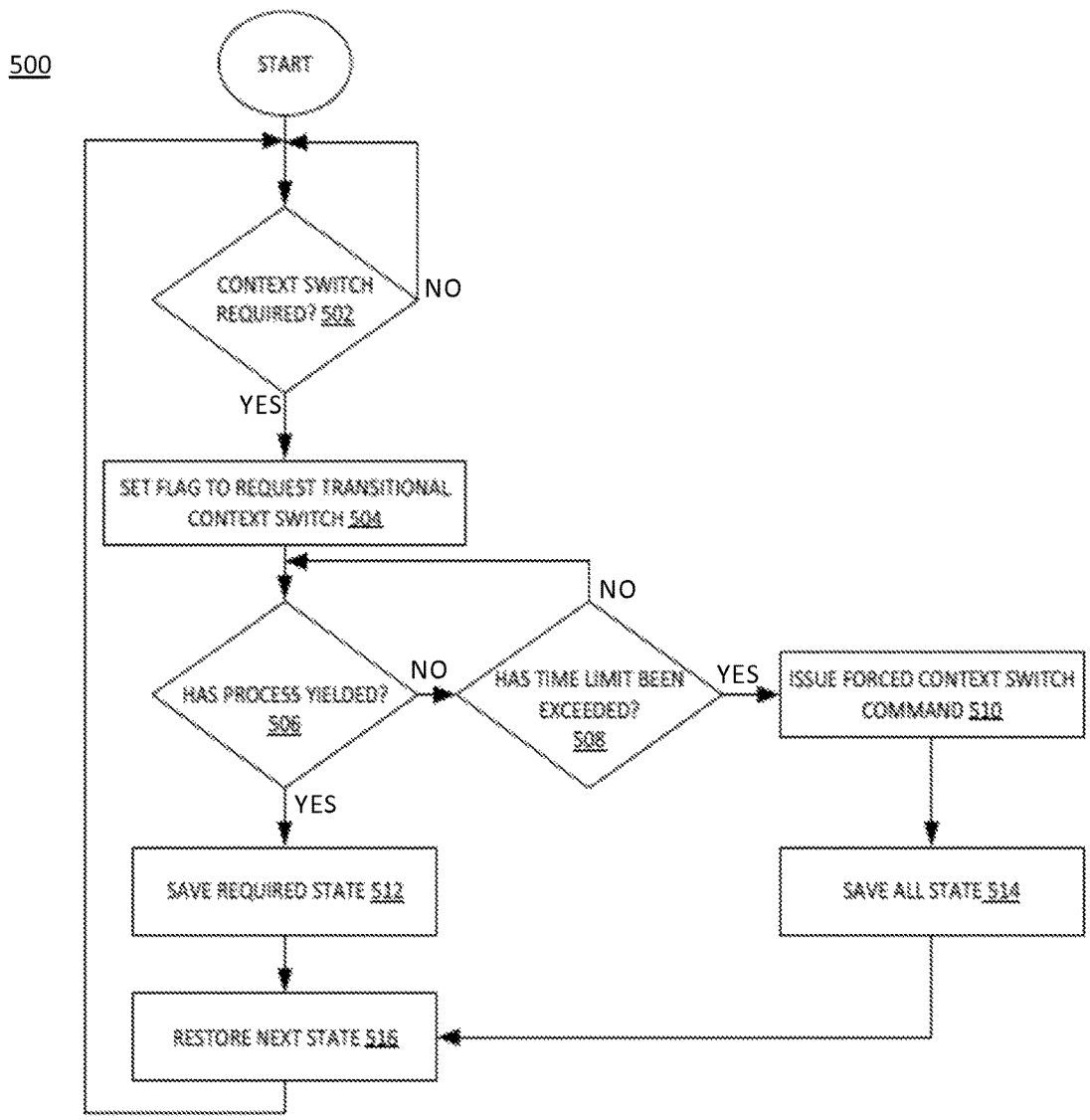
FIG. 5 is a detailed flow chart showing an example context switching process.

Referring to FIG. 5, a flow chart illustrates example process 500 that provides more detail for operating a context switch according to the features described herein. Example process 500 is arranged in accordance with at least some implementations of the present disclosure. In general, process 500 may provide a computer-implemented method for context switching. In the illustrated implementation, process 500 may include one or more operations, functions or actions as illustrated by one or more of operations 502 to 516 numbered evenly. By way of non-limiting example, process 500 will be described herein with reference to operations discussed with respect to the figures and implementations described herein, and particularly FIG. 4.

The process 500 may include "context switch required?" 502, which is an inquiry maintained by the context switch manager 420. When a switch is required, context switch manager 420 sets context switch transition flag register 432 to request 504 a transitional context switch. When the process executing on processor logic units 412 reaches a transitional point, it executes a test instruction to determine if transition flag register 432 is set, and if the test passes, it executes a yield or software exception instruction. The imaging kernel running on the accelerator may periodically check this flag, by one example, after image processing of each frame has been completed. In an alternative form, the test for a transitional point is performed by comparing the program counter 426 against a known value that is associated with, or indicates, a transition in the program. A check may then be performed 506 to see if the process has yielded.

When the process yields, it invokes context switch handler 428 which triggers a callback via callback unit 430. Callback unit 430 causes processor logic units 412 to execute code that determines what state should be saved and issues commands to DMA 436 to save 512 the required state. The application, or kernel writer for example, determines which parts of the state to discard. This may include discarding old data such as line buffers for image processing or buffers of intermediate results generated during calculation for example. The process is monitored to determine whether the time limit has been exceeded 508. This may include, by one example, issuing a request every 8 ms, and determining if the yield is performed by 12 ms. Many other examples exist, such as setting the time limits for 7-9 ms requests with yield limits at 11-13 ms for example, or simply at 2-5 ms after the request. This may be set dynamically and adjusted based on performance. If the process fails to yield promptly, the "has time limit been exceeded" test 508 is true (which is one example way, is considered meeting a condition for forcing a faster context switch), and therefore, "issue forced context switch command" 510 is triggered which causes "save all state" 514 to be executed. When "save required state" 512 or "save all state" 514 has completed, the next context is loaded 516 and execution resumed.

By one example, a processing accelerator may be running two kernels, each with a required frame rate of 60 fps. The processing accelerator may have 128K bytes of local RAM to save and restore for each context switch which occurs 120 times a second to support the required frame rate. If the RAM is 32 bits wide at 600 MHz, approximately 5% of the processing time will be consumed by the save and restore. If the applications are capable of running faster than the required frame rate, the accelerator will sleep when idle. In this case, context switch save/restore might not affect performance because it is executed during time that the accelerator would be idle but does increase power by keeping the accelerator awake when it would otherwise have been idle. If both applications can complete processing in 8 mS with a 60 fps frame rate, the accelerator would normally sleep 50% of the time, but the context switch will keep them both awake for 10% longer. If deferring the context switch until a frame has been completed removes the need to save the local RAM, all of this power can be reclaimed and the load on system DRAM reduced.

Figure 6:
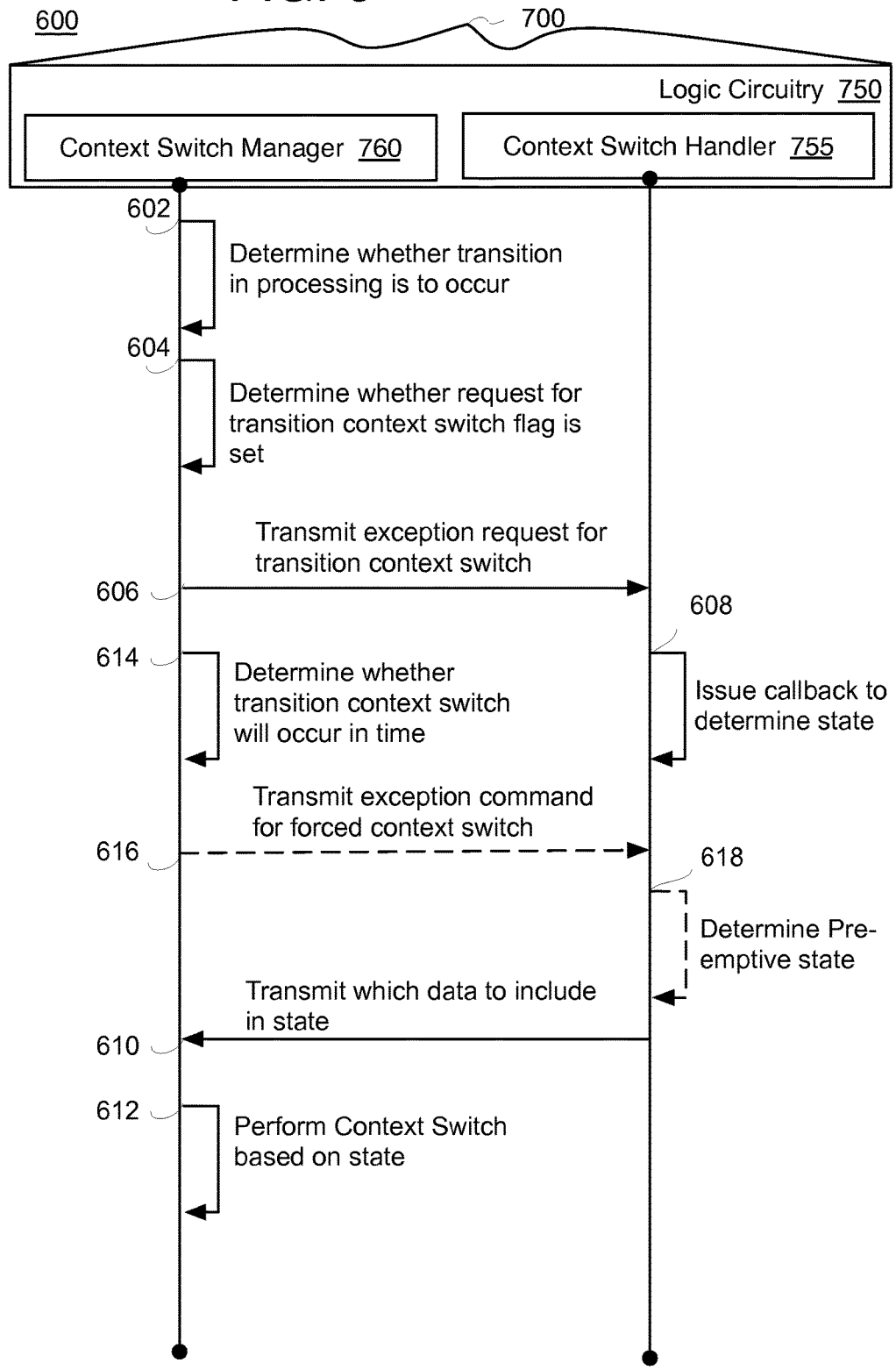
FIG. 6 is an illustrative diagram of an example system in operation for providing context switching for a processing accelerator.

Referring to FIG. 6, a flow chart illustrates an example process 600, arranged in accordance with at least some implementations of the present disclosure. In general, process 600 may provide a computer-implemented method for context switching. In the illustrated implementation, process 600 may include one or more operations, functions or actions as illustrated by one or more of operations 602 to 618 numbered evenly, and used alternatively or in any combination. By way of non-limiting example, process 600 will be described herein with reference to operations discussed with respect to FIGS. 1-5 and example system 700 of FIG. 7 as discussed below.

Figure 7:
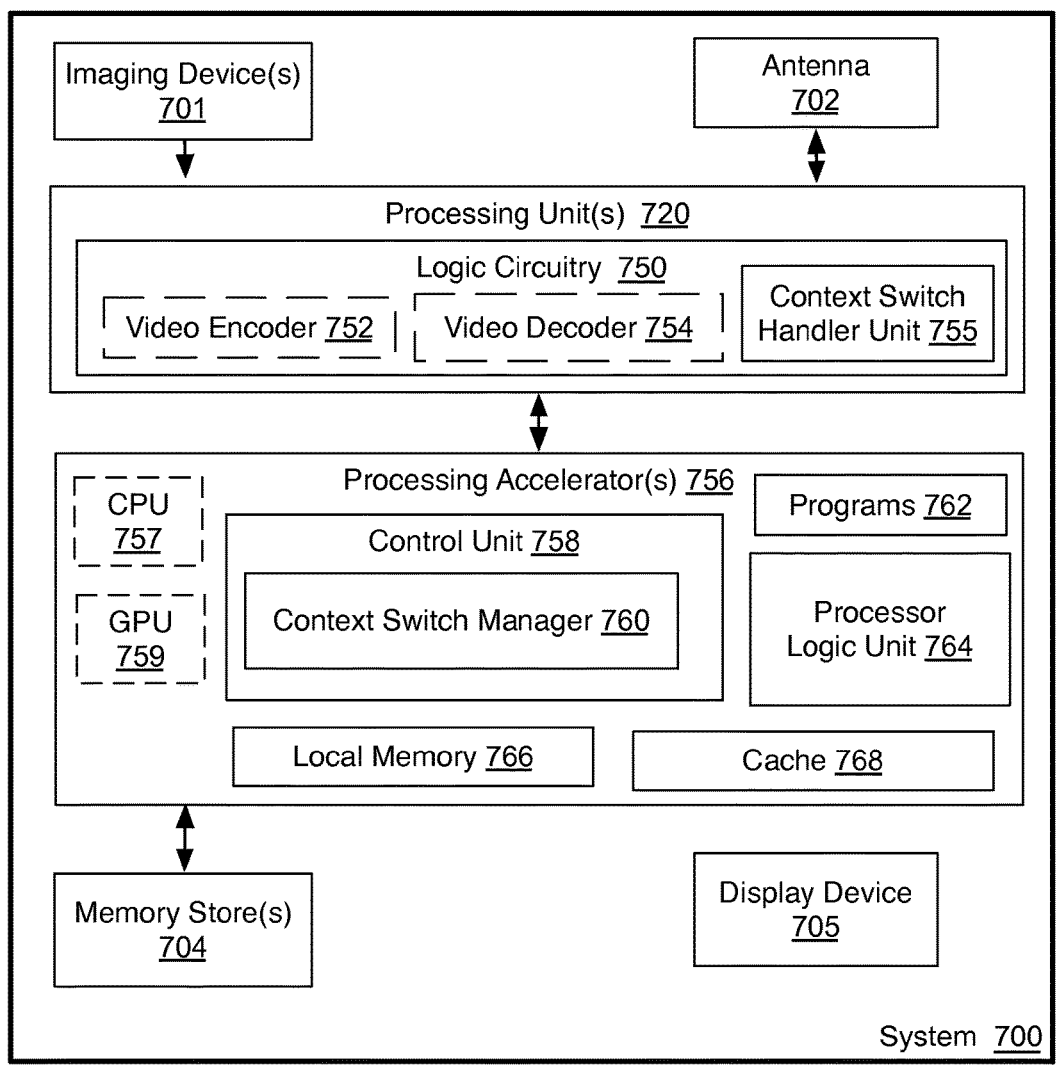
FIG. 7 is an illustrative diagram of an example system.

Referring to FIG. 7, system 700 may be used for example context switching process 600 shown in operation, and arranged in accordance with at least some implementations of the present disclosure. In the illustrated implementation, system 700 may include processing unit or units 720 with logic units or logic modules 750, the like, and/or combinations thereof. For one example, logic modules 750 may include a video encoder 752, a video decoder 754, and, a context switch handler 755. Also, the system 700 may also include a processing accelerator 756 with a control unit 758 that may have a context switch manager 760 (with context switch scheduler as mentioned above in other implementations).

Although system 700, as shown in FIG. 7, may have one particular set of operations or actions associated with particular units or modules, these operations or actions may be associated with different modules than the particular module illustrated here. Although process 600, as illustrated, is directed to context switching with a processing accelerator, it may also be applied to one or more processors or processor units that are not necessarily considered an accelerator.

It is understood that process 600 begins while a processing accelerator is already performing a process in accordance with an application. Process 600 may include "determine whether break (or transition) in processing is to occur" 602. Particularly, as mentioned above, the process may be image processing, and the break or transition may occur in between the processing of frames in a video sequence.

Process 600 may include "determine whether request for transition context switch flag is set" 604. When set, the context switch manager 760 then proceeds to execute an exception request and "transmit exception request for transition context switch" 606, and to the context switch handler 754 in order to "issue callback to determine state" 608 from the application that is running. The callback is part of the application executing on the accelerator that is not executed as part of normal operation; instead the address of the first instruction is registered with the context switch manager when the application first begins to execute, and a jump or subroutine call instruction to that address is executed under control of the context switch manager.

Process 600 may include "transmit which data to include in state" 610 once the callback is returned with the information indicating which data to save and which to discard.

Process 600 may include "perform context switch based on state" 612. Thus, once the state is received, the context switch manager may perform the context switch. This may include the state being received from the handler in the form of save instructions that may be provided to the DMA to place the correct data in non-local or other memory for restoration later.

Otherwise, process 600 may include "determine whether transition context switch will occur in time" 614. This may include determining whether the current running program or kernel is yielding on time to perform the context switch so that the QOSs are met. This may be formed by setting fixed time limits, but in one example it may be performed heuristically by setting initial dynamic time limits. In one example, a request maybe performed every 8 ms, and the transition context switch is considered on time if it occurs by 12 ms (4 ms later). By this form, the system 100 or 700 may monitor performance to adjust the target time limits. If the transition context switch is not going to occur in time to preserve the QOS target rates for example, then process 600 may include "transmit exception command for forced context switch 616". Process 600 then may include "determine pre-emptive state" 618, before transmitting which data to include in the state 610 as before, and performing the context switch 612.

In general, process 600 may be repeated any number of times either in serial or in parallel, as needed. Furthermore, in general, logic units or logic modules, such as context switch manager 422 or 760 may be implemented, at least in part, hardware, software, firmware, or any combination thereof.

While implementation of example process 300, 500, or 600 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

Referring to FIG. 7, an example system 700 using one or more processing accelerators 756 may be arranged in accordance with at least some implementations of the present disclosure. In the illustrated implementation, the processing accelerator(s) 756 may be, or have, one or more central processing units (CPUs) 757 or graphic processing units (GPUs) 759 or any combination of both, or it may be a circuit board or card with one or more CPUs or GPUs or a combination of both.

The processing accelerator 756 may have a control unit 758 with a context switch manager 760. The processing accelerator 756 may also have one or more program stores 762 for storing programs or instructions for example. The processing accelerator 756 may also have at least one processor logic unit 764, such as one or more ALU or FPU with data registers and control registers, as well as a local memory 766 including local RAM by one example, and a cache memory 768 as well. These components provide for many of the functions described above to perform a context switch.

The system 700 may also have a processing unit 720 that communicates with an imaging device 701, such as a camera for example, and an antenna 702 to receive or transmit data wirelessly. Processing accelerators 756, a memory store 704 which may include main memory, internal, external, and/or shared cache, and so forth, and/or a display device 705 to display output image data may be capable of communication with one another, via, for example, a bus, wires, or other access. In various implementations, display device 705 may be integrated in system 700 or implemented separately from system 700. The processing unit 720 may have logic circuitry 750 that, for a video display system, may include a video encoder 752 and/or a video decoder 754 for processing of image data and by use of the processing accelerator 756. At a minimum, logic circuitry 750 has a context switch handler 755 like the handlers described herein.

As will be appreciated, the components illustrated in FIG. 7 may include a variety of software and/or hardware modules and/or modules that may be implemented via software or hardware or combinations thereof. For example, the modules may be implemented as software via processing accelerator 756 by using central processing units 757 and/or graphics processing units 759, or the modules may be implemented via a dedicated hardware portion or portions of graphics processing units. Furthermore, both the local memory 766 and the shown memory stores 704 may be shared memory for the components of the processing accelerator 756, for example. Also, system 700 may be implemented in a variety of ways. For example, system 700 (excluding display device 705) may be implemented as a single chip or device having a graphics processor, a quad-core central processing unit, a memory controller input/output (I/O) module. In other examples, system 700 (again excluding display device 705) may be implemented as a chipset.

The processing accelerator 756 and/or the central processing units 757 may include any suitable implementation including, for example, microprocessor(s), multicore processors, application specific integrated circuits, chip(s), chipsets, or the like. Furthermore, when the processing accelerator uses graphics processing units 759, the GPUs may include any suitable implementation including, for example, processor(s), multicore processors, application specific integrated circuits, programmable logic devices, graphics cards, integrated graphics, general purpose graphics processing unit(s), or the like. In addition, memory stores 704 or local memory 768 may be any type of memory such as volatile memory (e.g., Static Random Access Memory (SRAM), Dynamic Random Access Memory (DRAM), etc.)

or non-volatile memory (e.g., flash memory, etc.), and so forth. In a non-limiting example, memory stores 704 and/or at least portions of local memory 766 also may be implemented via cache memory. In various examples, system 700 may be implemented as a chipset or as a system on a chip.

Figure 8:
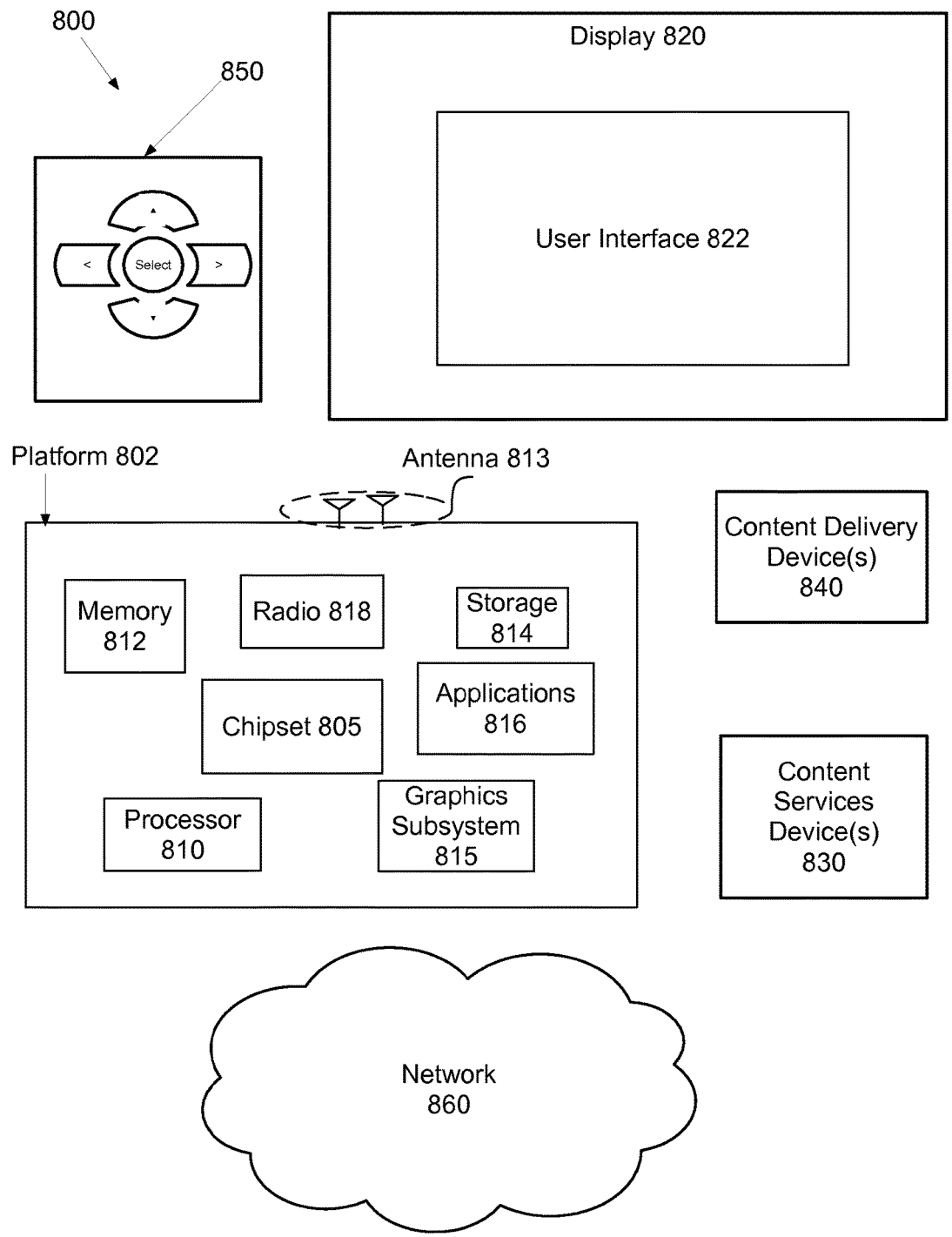
FIG. 8 is an illustrative diagram of another example system.

Referring to FIG. 8, an example system 800 in accordance with the present disclosure and various implementations, may be a media system although system 800 is not limited to this context. For example, system 800 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internets device (MID), messaging device, data communication device, and so forth.

In various implementations, system 800 includes a platform 802 communicatively coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In implementations, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In implementations, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various implementations, platform 802 and display 820 may be an integrated unit. Display 820 and content service device(s) 830 may be integrated, or display 820 and content delivery device(s) 840 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Figure 9:
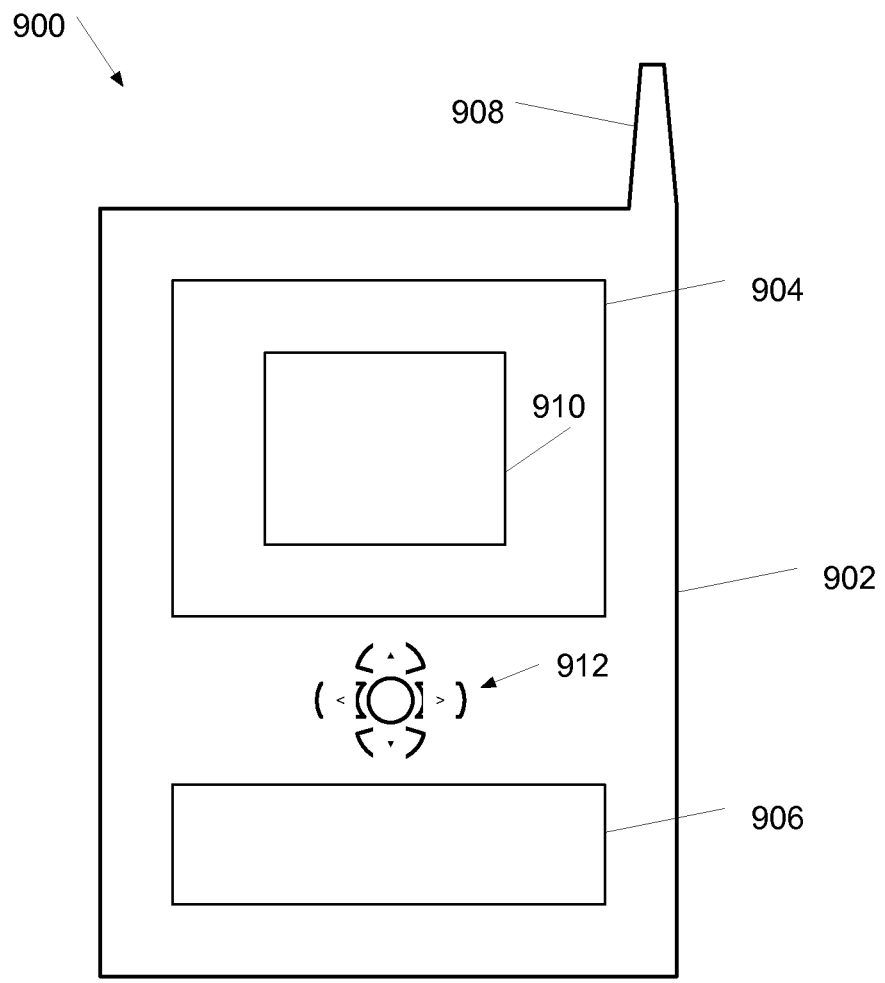
FIG. 9 illustrates another example device, all arranged in accordance with at least some implementations of the present disclosure.

As described above, system 700 or 800 may be implemented in varying physical styles or form factors. FIG. 9 illustrates implementations of a small form factor device 900 in which system 700 or 800 may be implemented. In implementations, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internets device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 1906 may include any suitable I/O device for entering information into a mobile computing device. Examples for I/O device 1906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method for context switching comprises requesting a transition context switch deferrable until a state to be saved is smaller than at the time the request is made; and forcing a context switch to occur if a condition is met before the request is carried out.

Otherwise, the method comprises scheduling the transition to occur during a predictable transition in a process being performed by a processing accelerator; forcing the context switch when waiting for the deferred context switch to occur will cause the processor to miss a time-based target, wherein the time-based target is associated with a target frame rate associated with a video sequence, and wherein the context switch is deferred a time period between processing of frame data of two frames in a video sequence of a plurality of frames being processed; checking whether the request for a context switch is under control of a program; and executing a callback in response to the request being set, said callback determining the state that is to be saved as part of said context switch, wherein the state at least comprises data indicating the hardware settings to perform a process, and a program counter setting to indicate where along the process the context switch occurred.

By other approaches, a system comprises a processing accelerator performing a process; and a context switch scheduler to schedule a context switch to occur during a transition in the process being performed, wherein the transition reduces the state to be saved to perform the context switch, wherein the processing accelerator to force a context switch rather than waiting for the transition context switch to occur if a condition is met before the transition context switch is carried out.

Otherwise, the system has a processing accelerator that is to force the context switch when waiting for the transition context switch to occur will cause the processor to miss a time-based target; wherein the time-based target is associated with a target frame rate associated with a video sequence; wherein the transition comprises a time period between processing of frame data of two frames in a video sequence of a plurality of frames being processed; wherein the transition comprises a time period when the processor is finished using image data of one frame and in a local memory, and before the image data of a next frame to be processed is placed in the local memory so that the image data at the local memory does not need to be saved as part of the state for the transition context switch. The system comprising a flag optionally set at the processing accelerator to indicate that a transition context switch is requested; and comprising a context switch handler to issue a callback to an application running the process and to determine which data is to be saved as part of the state; and wherein the state at least comprises data indicating the hardware settings to perform the process, and a program counter setting to indicate where along the process the context switch occurred.

By other approaches, at least one computer-readable media comprising instructions, that when executed by a computing device, cause the computing device to: request a transition context switch deferrable until a state to be saved is smaller than at the time the request is made; and force a context switch to occur if a condition is met before the request is carried out.

By another aspect, the media comprising instructions to: schedule the transition to occur during a predictable transition in a process being performed by a processing accelerator; force the context switch when waiting for the deferred context switch to occur will cause the processor to miss a time-based target, wherein the time-based target is associated with a target frame rate associated with a video sequence, and wherein the context switch is deferred a time period between processing of frame data of two frames in a video sequence of a plurality of frames being processed; check whether the request for a context switch is under control of a program; and execute a callback in response to the request being set, said callback determining the state that is to be saved as part of said context switch, wherein the state at least comprises data indicating the hardware settings to perform a process, and a program counter setting to indicate where along the process the context switch occurred.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of context switching comprising:
    placing data into registers of a processor to process a first frame of a video sequence, wherein the processing of the data will end before the end of processing of the first frame;
    requesting a transition context switch in the registers and intentionally deferrable to delay the transition context switch to remove the data from the registers until the end of the processing of the first frame and before the start of processing of a next frame when a predetermined state to be saved is smaller than at the time the request is made; and
    forcing a context switch in the registers to occur before the end of the processing of the first frame if a condition is met before the request is carried out comprising determining a different state to be saved at the time of the forced context switch.

2. The method of claim 1 comprising scheduling the transition to occur during a predictable transition in a process being performed by a processing accelerator of the processor.

3. The method of claim 1 comprising forcing the context switch when waiting for the deferred context switch to occur will cause the processor to miss a time-based target.

4. The method of claim 3 wherein the time-based target is associated with a target frame rate associated with a video sequence.

5. The method of claim 1 comprising checking whether the request for a context switch is under control of a program.

6. The method of claim 1 comprising executing a callback in response to the request being set, said callback determining the state that is to be saved as part of said context switch.

7. The method of claim 1 wherein the state at least comprises data indicating the hardware settings to perform a process, and a program counter setting to indicate where along the process the context switch occurred.

8. The method of claim 1 comprising:
    scheduling the transition to occur during a predictable transition in a process being performed by a processing accelerator of the processor;
    forcing the context switch when waiting for the deferred context switch to occur will cause the processor to miss a time-based target, wherein the time-based target is associated with a target frame rate associated with a video sequence
    checking whether the request for a context switch is under control of a program; and
    executing a callback in response to the request being set, said callback determining the state that is to be saved as part of said context switch, wherein the state at least comprises data indicating the hardware settings to perform a process, and a program counter setting to indicate where along the process the context switch occurred.

9. A system comprising:
    a processor that is a processing accelerator performing a process related to a first frame of a video sequence;
    registers of the processing accelerator holding data to process the first frame of a video sequence, wherein the processing of the data will end before the end of processing of the first frame; and
    a context switch scheduler to schedule an intentionally delayed transition context switch in the registers to delay the transition context switch to remove the data from the registers, and delayed until a transition that comprises the end of the processing of the first frame and before the start of processing of a next frame when a predetermined state to be saved to perform the transition context switch is reduced,
    wherein the processing accelerator to force a context switch in the registers rather than waiting for the transition context switch to occur before the end of the processing of the first frame if a condition is met before the transition context switch is carried out comprising determining a different state to be saved at the time of the forced context switch.

10. The system of claim 9 wherein the processing accelerator is to force the context switch when waiting for the transition context switch to occur will cause the processor to miss a time-based target.

11. The system of claim 10 wherein the time-based target is associated with a target frame rate associated with a video sequence.

12. The system of claim 9 wherein the transition comprises a time period when the processor is finished using image data of the first frame and in a local memory, and before the image data of the next frame to be processed is placed in the local memory so that the image data at the local memory does not need to be saved as part of the state for the transition context switch.

13. The system of claim 9 comprising a flag optionally set at the processing accelerator to indicate that a transition context switch is requested.

14. The system of claim 9 comprising a context switch handler to issue a callback to an application running the process and to determine which data is to be saved as part of the state.

15. The system of claim 9 wherein the state at least comprises data indicating the hardware settings to perform the process, and a program counter setting to indicate where along the process the context switch occurred.

16. The system of claim 9 wherein the processing accelerator is to force the context switch when waiting for the transition context switch to occur will cause the processor to miss a time-based target;
    wherein the time-based target is associated with a target frame rate associated with a video sequence;
    wherein the transition comprises a time period when the processor is finished using image data of the first frame and in a local memory, and before the image data of the next frame to be processed is placed in the local memory so that the image data at the local memory does not need to be saved as part of the state for the transition context switch;
    comprising a flag optionally set at the processing accelerator to indicate that a transition context switch is requested;
    comprising a context switch handler to issue a callback to an application running the process and to determine which data is to be saved as part of the state; and
    wherein the state at least comprises data indicating the hardware settings to perform the process, and a program counter setting to indicate where along the process the context switch occurred.

17. At least one non-transitory computer-readable media comprising instructions, that when executed by a computing device, cause the computing device to:
place data into registers of a processor to process a first frame of a video sequence, wherein the processing of the data will end before the end of processing of the first frame;
request a transition context switch in the registers and intentionally deferrable to delay the transition context switch to remove the data from the registers until the end of the processing of the first frame and before the start of processing of a next frame when a predetermined state to be saved is smaller than at the time the request is made; and
force a context switch in the registers to occur before the end of the processing of the first frame if a condition is met before the request is carried out comprising determining a different state to be saved at the time of the forced context switch.

18. The media of claim 17 comprising instructions that cause the computing device to schedule the transition to occur during a predictable transition in a process being performed by a processing accelerator of the processor.

19. The media of claim 17 comprising instructions that cause the computing device to force the context switch when waiting for the deferred context switch to occur will cause the processor to miss a time-based target.

20. The media of claim 19 wherein the time-based target is associated with a target frame rate associated with a video sequence.

21. The media of claim 17 comprising checking whether the request for a context switch is under control of a program.

22. The media of claim 17 comprising instructions to:
schedule the transition to occur during a predictable transition in a process being performed by a processing accelerator of the processor;
force the context switch when waiting for the deferred context switch to occur will cause the processor to miss a time-based target, wherein the time-based target is associated with a target frame rate associated with a video sequence
check whether the request for a context switch is under control of a program; and
execute a callback in response to the request being set, said callback determining the state that is to be saved as part of said context switch, wherein the state at least comprises data indicating the hardware settings to perform a process, and a program counter setting to indicate where along the process the context switch occurred.

* * * * *